V. RILEY.
DETACHABLE WHEEL.
APPLICATION FILED SEPT. 7, 1911.
1,010,803.
Patented Dec. 5, 1911.
2 SHEETS—SHEET 1.
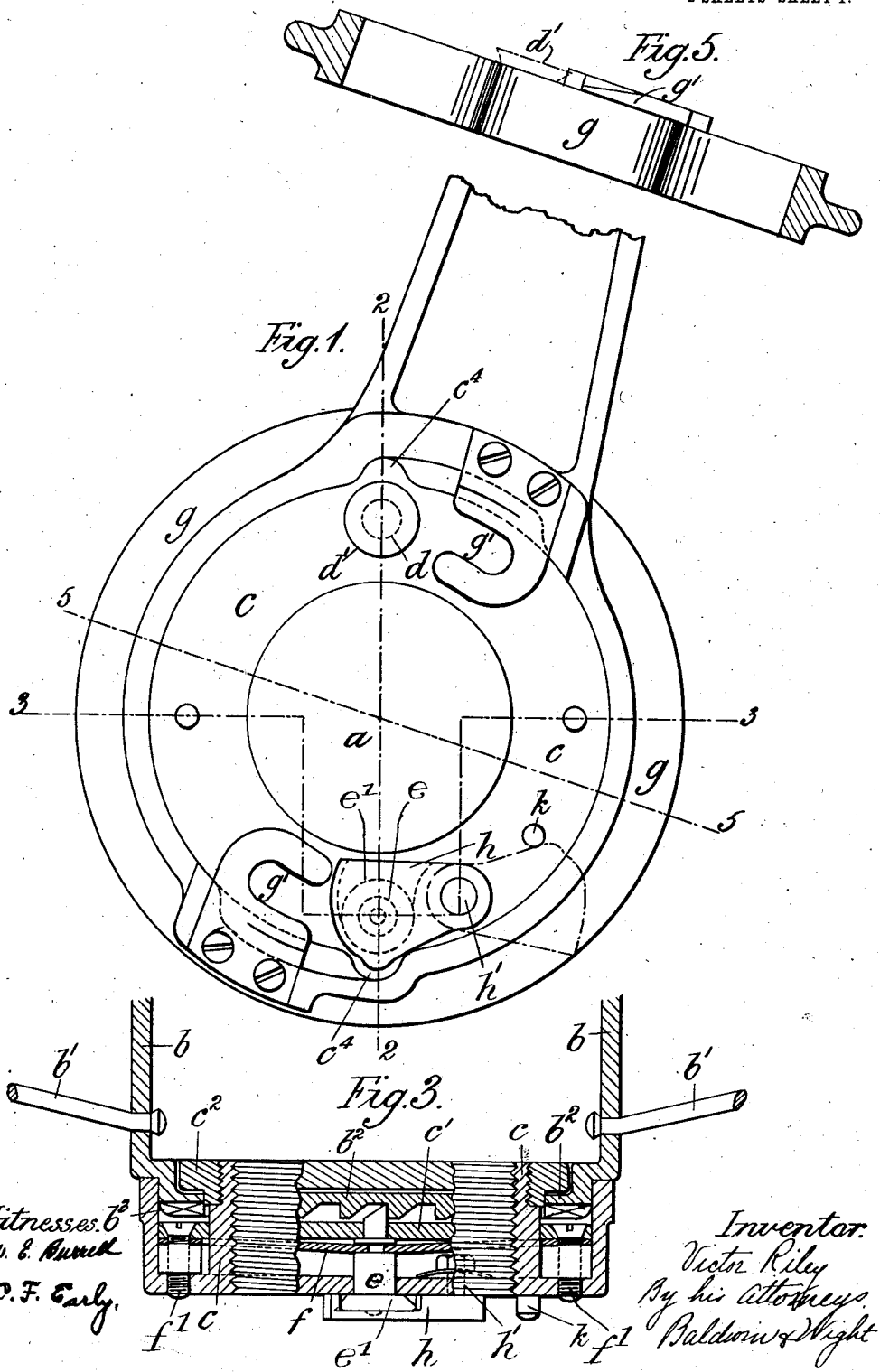

V. RILEY.
DETACHABLE WHEEL.
APPLICATION FILED SEPT. 7, 1911.
1,010,803.
Patented Dec. 5, 1911.
2 SHEETS—SHEET 2.
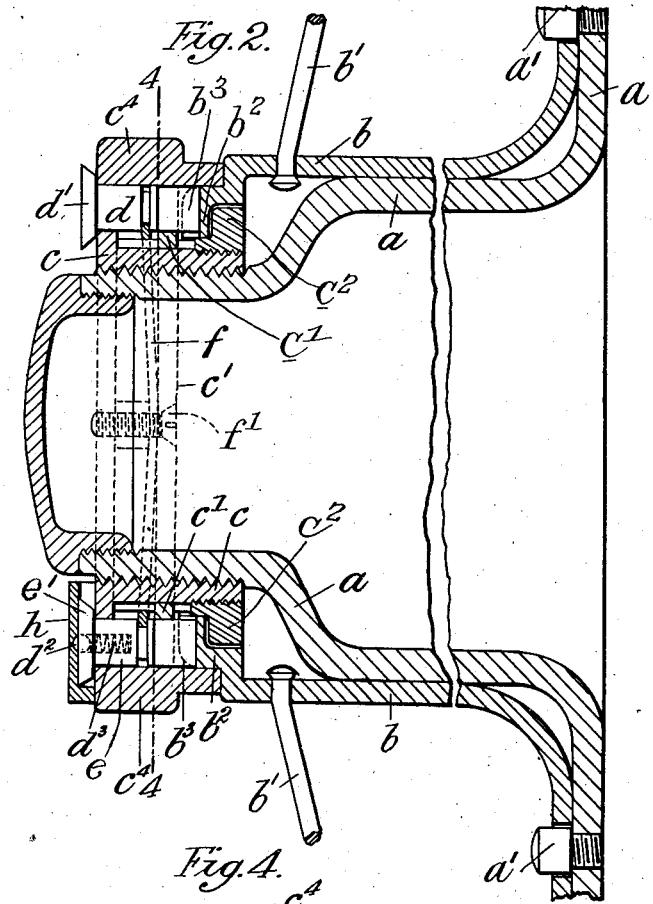
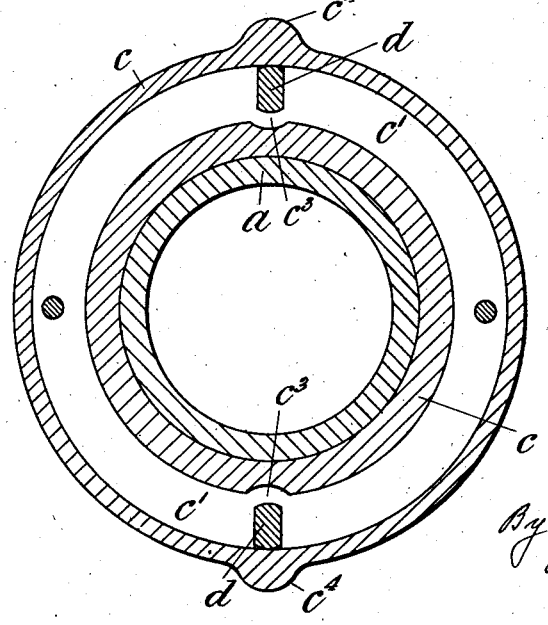
Witnesses.
M. E. Burrell
C. F. Early.
Inventor:
Victor Riley
By his Attorneys,
Baldwin & Wight

UNITED STATES PATENT OFFICE.

VICTOR RILEY, OF HOLLYBANK, COVENTRY, ENGLAND.

DETACHABLE WHEEL.

1,010,803.   Specification of Letters Patent.   Patented Dec. 5, 1911.

Application filed September 7, 1911. Serial No. 648,194.

*To all whom it may concern:*

Be it known that I, VICTOR RILEY, a subject of the King of Great Britain, residing at Hollybank, Radford Road, Coventry, England, have invented new and useful Improvements in Detachable Wheels, of which the following is a specification.

This invention relates to detachable wheels in which the hub carries a nut free to turn in it and adapted to screw onto the permanent hub or axle, the detachable wheel being fixed in place by locking this nut to its hub.

According to this invention the detachable nut is provided with a pair of automatic locks. Each automatic lock is a spring actuated plunger pawl adapted to engage in ratchet teeth in the removable hub. This plunger pawl has on its outer end an enlarged head, lying, when in a locked position, a small distance away from the face of the nut. The spanner fits around the outside of the nut and engages with lugs upon it sufficient play being however provided to allow of a small relative movement of rotation. The spanner has claw-like projections fitted to it, which are of tapered shape adapted to engage behind the enlarged heads of the plunger pawls, and when rotated the slight relative movement (before turning the nut) withdraws the plunger pawls from their ratchet teeth. A single spring is preferably employed for both of the pawls. This spring is in the form of an annular plate slightly bent along a diameter. The plunger pawls are prevented from turning by their ends being square or D shaped and fitting the guide plate (also serving as a cover plate for the spring) which plate is fixed in position by projecting tongues fitting corresponding grooves in the main lock nut, or the guide plate may be pinned or otherwise fixed. One or both of the plunger pawls has a tongue or suitably shaped cover which swings over it, thereby insuring that even if the spring should break or become in any way deranged, the pawl would be still kept in positive engagement with the ratchet teeth. The pawl or pawls may carry a spring pressed ball or pin adapted to engage with a recess in the cover so as to retain it in position.

Figure 1 is an end elevation illustrating the arrangement, the spanner being shown in place. Figs. 2 and 3 are sections on the lines 2—2 and 3—3, Fig. 1, the spanner being removed. Fig. 4 is a section on the line 4—4, Fig. 2, and Fig. 5 is a section of the spanner on the line 5—5, Fig. 1.

$a$ is the permanent hub and $b$ the hub of the detachable wheel, part of two of the spokes of which are shown at $b'$. When the hub $b$ is in place it is prevented in the ordinary manner from turning relatively to the hub $a$ by studs $a'$ fixed to the latter.

$c$ is a nut screwing onto the end of the permanent hub $a$ and it has fixed to it a thrust ring $c'$ and a withdrawal ring $c^2$ which embrace between them an inwardly projecting radial flange $b^2$ on the hub $b$ so that by turning the nut $c$ in one direction or the other the hub $b$ is drawn onto or off the hub $a$. The ring $c'$ is prevented from turning on the nut $c$ by projections $c^3$ (Fig. 4) which engage with corresponding grooves in the nut. The ring $c'$ has two holes through it which serve as guides or bearings for the plunger pawls $d$ and $e$ which engage with a ring of teeth $b^3$ on the outer end of the hub $b$.

$f$ is a spring in the form of an annular plate fixed to the nut $c$ by screws $f'$ and acting on the pawls $d$ and $e$. This spring is so bent that it tends to force pawls into gear with the teeth $b^3$. The pawls $d$ and $e$ have undercut heads $d'$ and $e'$ which project above the face of the nut $c$.

$g$ is a spanner fitting around the nut $c$ and engaging with lugs $c^4$ on it but as is clearly seen at Fig. 1 a small relative movement of rotation is allowed. The spanner $g$ has fixed to it claw like projections $g'$ adapted to engage with the heads $d'$ and $e'$ and draw the pawls $d$ and $e$ out of gear with the teeth $b^3$. The pawl $e$ is acted on by a cover $h$ pivoted at $h'$ so that when the lever is turned into the position shown in full lines in Fig. 1 the pawl $e$ is prevented from coming out of gear with the teeth $b^3$ and when in the position shown in dotted lines prevents the spanner from being removed. The cover $h$ is held in its locked position by a ball $d^2$ in the pawl $e$ which is pressed outward by a spring $d^3$ and engages with a corresponding cavity in the underside of the cover.

$k$ is a stop for preventing the cover $h$ being turned beyond its dotted position Fig. 1.

What I claim is:—

The combination with a detachable hub carrying a nut free to turn in it and provided with a pawl adapted to engage with a ring of teeth in it; of a cover pivoted to the nut and adapted to be turned over the pawl and to hold it in engagement with the teeth and means for controlling the movement of the cover in such manner that when it is not above the pawl it projects beyond the periphery of the nut.

VICTOR RILEY.

Witnesses:
R. B. RANSFORD,
ARTHUR CARPMAEL, Jr.